US010185463B2

(12) United States Patent
You et al.

(10) Patent No.: US 10,185,463 B2
(45) Date of Patent: Jan. 22, 2019

(54) METHOD AND APPARATUS FOR PROVIDING MODEL-CENTERED ROTATION IN A THREE-DIMENSIONAL USER INTERFACE

(71) Applicant: Nokia Technologies Oy, Espoo (FI)

(72) Inventors: Yu You, Kangasala (FI); Kimmo Tapio Roimela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 407 days.

(21) Appl. No.: 14/622,176

(22) Filed: Feb. 13, 2015

(65) Prior Publication Data

US 2016/0239181 A1    Aug. 18, 2016

(51) Int. Cl.
*G06F 3/0481* (2013.01)
*G06T 3/60* (2006.01)
(Continued)

(52) U.S. Cl.
CPC ...... *G06F 3/04815* (2013.01); *G06F 3/04845* (2013.01); *G06T 3/60* (2013.01);
(Continued)

(58) Field of Classification Search
CPC ............. G06F 3/04815; G06F 3/04842; G06T 15/205; G06T 15/06; G06T 19/003; G06T 3/60; G06T 2200/24
See application file for complete search history.

(56) References Cited

U.S. PATENT DOCUMENTS 5,857,119 A * 1/1999 Borden ................. G03B 15/00
                                                   396/428
6,525,731 B1 * 2/2003 Suits ....................... G06T 15/04
                                                   345/421
(Continued)

FOREIGN PATENT DOCUMENTS

WO     2011148034 A1    12/2011
WO     2012071435 A1    5/2012

OTHER PUBLICATIONS

Edward R. Sykes, "Determining the Effectiveness of the 3D Alice Programming Environment at the Computer Science I Level", 2007, Sheridan College: Faculty Publicatons and Scholarship, Paper 8, obtained on Jan. 27, 2018 from https://source.sheridancollege.ca/cgi/viewcontent.cgi?article=1007&context=fast_appl_publ.*

(Continued)

*Primary Examiner* — Shourjo Dasgupta
(74) *Attorney, Agent, or Firm* — Ditthavong & Steiner, P.C.

(57) ABSTRACT

An approach is provided for determining at least one selection of at least one object model in a three-dimensional world user interface, wherein the at least one object model is a three-dimensional representation of at least one object visible in the three-dimensional world user interface from a first camera view position, and wherein the three-dimensional world user interface presents at least one first panoramic image that is determined based, at least in part, on the first camera view position. The approach involves determining at least one interaction input with the at least one object model to cause, at least in part, a rotation of the at least one object model in the three-dimensional world user interface. The approach also involves causing, at least in part, a calculation of a second camera view position based, at least in part, on the rotation. The approach further involves determining at least one second panoramic image based, at (Continued)

least in part, on the second camera view position. The approach further involves causing, at least in part, a rendering of the three-dimensional world user interface based, at least in part, on the second camera view position to present the at least one second panoramic image.

20 Claims, 16 Drawing Sheets

(51) Int. Cl.
    *G06T 15/06*     (2011.01)
    *G06T 15/20*     (2011.01)
    *G06T 19/00*     (2011.01)
    *G06F 3/0484*     (2013.01)

(52) U.S. Cl.
    CPC ............ *G06T 15/06* (2013.01); *G06T 15/205* (2013.01); *G06T 19/003* (2013.01); *G06T 2200/24* (2013.01)

(56) References Cited

U.S. PATENT DOCUMENTS

| | | | |
|---|---|---|---|
| 6,618,851 B1* | 9/2003 | Zundel | G06F 17/50 711/156 |
| 6,987,512 B2* | 1/2006 | Robertson | G06F 3/04815 345/156 |
| 8,233,008 B2* | 7/2012 | Jin | G06T 19/20 345/619 |
| 8,294,766 B2* | 10/2012 | Tsai | G01C 21/20 345/419 |
| 8,314,789 B2* | 11/2012 | Fitzmaurice | G06F 3/04815 345/157 |
| 8,531,449 B2* | 9/2013 | Lynch | G06T 15/205 340/995.17 |
| 8,941,685 B1* | 1/2015 | Chapin | G06Q 30/0241 345/629 |
| 2003/0025788 A1* | 2/2003 | Beardsley | G06T 17/00 348/43 |
| 2003/0043170 A1 | 3/2003 | Fleury | |
| 2005/0046645 A1 | 3/2005 | Breton et al. | |
| 2009/0128552 A1* | 5/2009 | Fujiki | G06T 15/06 345/419 |
| 2011/0254915 A1 | 10/2011 | Vincent et al. | |
| 2011/0279452 A1 | 11/2011 | Ibe et al. | |
| 2012/0056982 A1* | 3/2012 | Katz | H04N 13/025 348/43 |
| 2013/0222373 A1* | 8/2013 | Weinstein | G06Q 50/16 345/419 |
| 2013/0285920 A1 | 10/2013 | Colley | |
| 2013/0321402 A1 | 12/2013 | Moore et al. | |
| 2013/0342533 A1 | 12/2013 | Bell et al. | |
| 2014/0062998 A1 | 3/2014 | Ofstad et al. | |
| 2014/0147032 A1* | 5/2014 | Yous | G06T 7/2033 382/154 |
| 2015/0130790 A1* | 5/2015 | Vasquez, II | G06T 19/006 345/419 |
| 2015/0365581 A1* | 12/2015 | Pryszo | H04N 5/23203 348/211.8 |
| 2016/0224219 A1* | 8/2016 | Hwang | G06F 3/04845 |

OTHER PUBLICATIONS

"What is Alice 3?", published to Apr. 3, 2014 and obtained on Jan. 27, 2019 from http://www.ntschools.org/cms/lib/NY19000908/Centricity/Domain/115/What%20is%20Alice%203.pdf.*

International Preliminary Report on Patentability for International Application No. PCT/FI2016/050041, dated Jun. 1, 2016, 5 Pages.

Written Opinion of the International Searching Authority for International Application No. PCT/FI2016/050041, dated Jun. 1, 2016, 9 Pages.

Notification of Transmittal of Translation of the International Preliminary Report on Patentability (Chapter I or Chapter II) for International Application No. PCT/FI2016/050041, dated Jun. 1, 2016, 1 Page.

Taehee Lee "Robust 3D Street-View Reconstruction using Sky Motion Estimation" Computer Vision Workshops (ICCV Workshops), 2009 IEEE 12th International Conference on, 2009, 8 Pages.

* cited by examiner

METHOD AND APPARATUS FOR PROVIDING MODEL-CENTERED ROTATION IN A THREE-DIMENSIONAL USER INTERFACE

BACKGROUND

Service providers and developers are continually challenged to deliver value and convenience to consumers by, for example, providing compelling network services. One area of interest has been the development of three-dimensional (3D) worlds and associated user interfaces that allow for user interaction (e.g., 3D maps, 3D virtual environments, 3D games, etc.). However, when browsing or interacting with such 3D worlds and user interfaces, users may often find it cumbersome or disorienting to explore 3D objects within the worlds (e.g., exploring 3D models of buildings within a mapping user interface). This problem can be particularly acute when performing an interaction operation such as rotating of the 3D object models. Accordingly, service providers and developers face significant technical challenges to enabling users to freely and easily browse or interact with 3D object models in a 3D world user interface.

SOME EXAMPLE EMBODIMENTS

Therefore, there is a need for an approach for providing model-centered rotation of 3D object models in a 3D user interface (e.g., rotating 3D models of buildings or other map features in a 3D map).

According to one embodiment, a method comprises determining at least one selection of at least one object model in a three-dimensional world user interface, wherein the at least one object model is a three-dimensional representation of at least one object visible in the three-dimensional world user interface from a first camera view position, and wherein the three-dimensional world user interface presents at least one first panoramic image that is determined based, at least in part, on the first camera view position. The method also comprises determining at least one interaction input with the at least one object model to cause, at least in part, a rotation of the at least one object model in the three-dimensional world user interface. The method further comprises causing, at least in part, a calculation of a second camera view position based, at least in part, on the rotation. The method further comprises determining at least one second panoramic image based, at least in part, on the second camera view position. The method also comprises causing, at least in part, a rendering of the three-dimensional world user interface based, at least in part, on the second camera view position to present the at least one second panoramic image.

According to another embodiment, an apparatus comprises at least one processor, and at least one memory including computer program code, the at least one memory and the computer program code configured to, with the at least one processor, cause, at least in part, the apparatus to determine at least one selection of at least one object model in a three-dimensional world user interface, wherein the at least one object model is a three-dimensional representation of at least one object visible in the three-dimensional world user interface from a first camera view position, and wherein the three-dimensional world user interface presents at least one first panoramic image that is determined based, at least in part, on the first camera view position. The apparatus is also caused to determine at least one interaction input with the at least one object model to cause, at least in part, a rotation of the at least one object model in the three-dimensional world user interface. The apparatus further causes, at least in part, a calculation of a second camera view position based, at least in part, on the rotation. The apparatus is further caused to determine at least one second panoramic image based, at least in part, on the second camera view position. The apparatus is also causes, at least in part, a rendering of the three-dimensional world user interface based, at least in part, on the second camera view position to present the at least one second panoramic image.

According to another embodiment, a computer-readable storage medium carries one or more sequences of one or more instructions which, when executed by one or more processors, cause, at least in part, an apparatus to determine at least one selection of at least one object model in a three-dimensional world user interface, wherein the at least one object model is a three-dimensional representation of at least one object visible in the three-dimensional world user interface from a first camera view position, and wherein the three-dimensional world user interface presents at least one first panoramic image that is determined based, at least in part, on the first camera view position. The apparatus is also caused to determine at least one interaction input with the at least one object model to cause, at least in part, a rotation of the at least one object model in the three-dimensional world user interface. The apparatus is further caused to cause, at least in part, a calculation of a second camera view position based, at least in part, on the rotation. The apparatus also causes, at least in part, a rendering of the three-dimensional world user interface based, at least in part, on the second camera view position. The apparatus is further caused to determine at least one second panoramic image based, at least in part, on the second camera view position. The apparatus is also causes, at least in part, a rendering of the three-dimensional world user interface based, at least in part, on the second camera view position to present the at least one second panoramic image.

According to another embodiment, an apparatus comprises means for determining at least one selection of at least one object model in a three-dimensional world user interface, wherein the at least one object model is a three-dimensional representation of at least one object visible in the three-dimensional world user interface from a first camera view position, and wherein the three-dimensional world user interface presents at least one first panoramic image that is determined based, at least in part, on the first camera view position. The apparatus also comprises means for determining at least one interaction input with the at least one object model to cause, at least in part, a rotation of the at least one object model in the three-dimensional world user interface. The apparatus further comprises means for causing, at least in part, a calculation of a second camera view position based, at least in part, on the rotation. The apparatus also comprises means for determining at least one second panoramic image based, at least in part, on the second camera view position The apparatus also comprises means for causing, at least in part, a rendering of the three-dimensional world user interface based, at least in part, on the second camera view position to present the at least one second panoramic image.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from)

any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing model-centered rotation in a three-dimensional (3D) user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to providing model-centered rotation with respect to building models of a 3D map user interface, it is contemplated that the various embodiments are also applicable to interaction with any 3D model object represented in any 3D environment (e.g., games, applications, etc.). For example, instead of or in addition to building models, the object models described herein may relate to other features including, but not limited to, building interior regions, structures inside buildings, landmarks, geological structures, subterranean regions, aerial regions, or the like.

In addition, although various embodiments are described with respect to interactions for rotating selected 3D objects, it is contemplated that the embodiments are also applicable to other types of interactions that can potential result in a change of camera view in a 3D world user interface. For example, other applicable interactions include, but are not limited to, panning, moving, zooming, enlarging, shrinking, etc.

Figure 1:
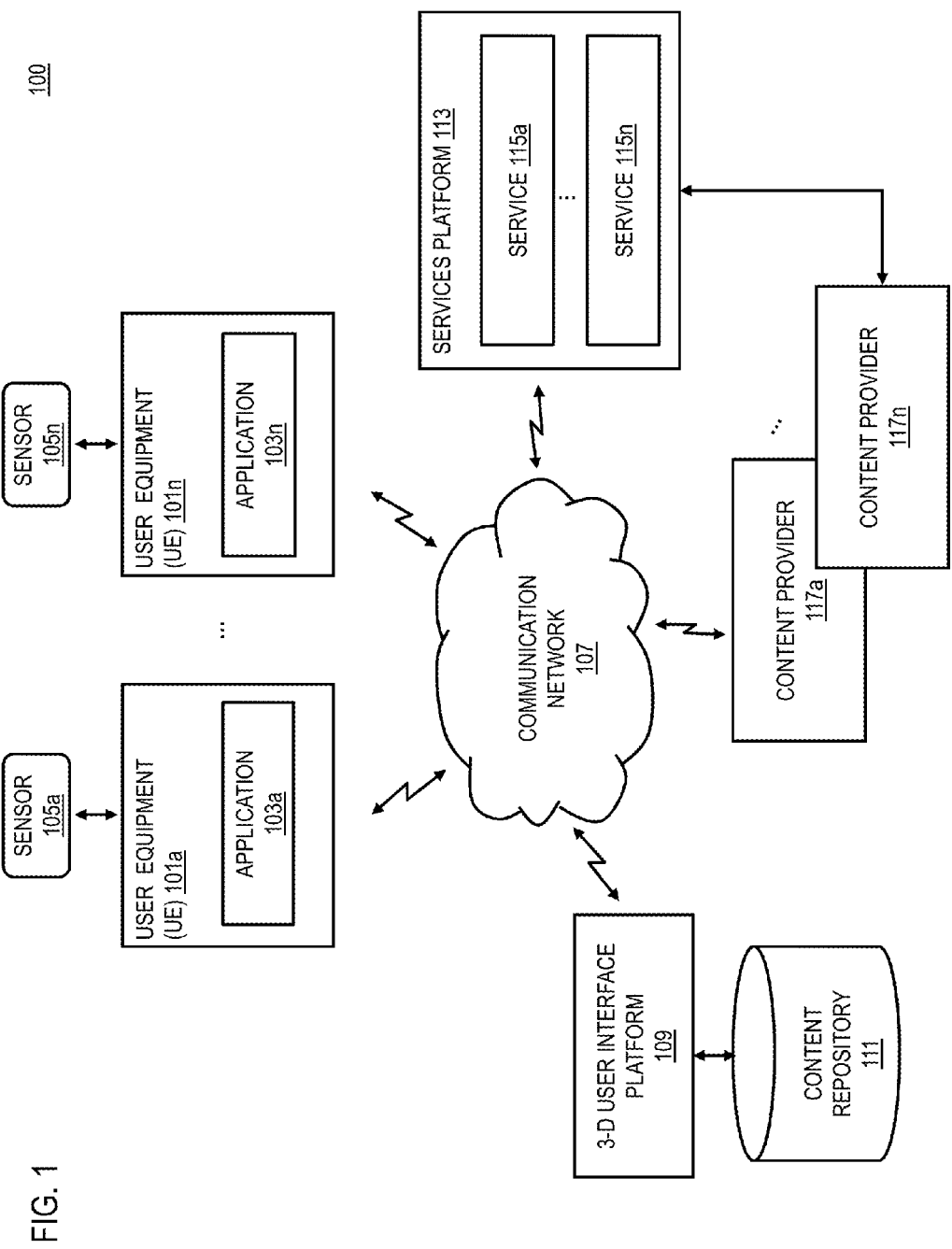
FIG. 1 is a diagram of a system capable of providing model-centered rotation in a 3D user interface, according to one embodiment.

FIG. 1 is a diagram of a system capable of providing model-centered rotation in a 3D user interface, according to one embodiment. As noted above, interactive browsing or exploration of 3D object models in a 3D world user interface can often be a cumbersome and disorienting experience for users. One common use of 3D world user interfaces is in the context of 3D map application and services. For example, many map applications and services support displaying 3D object models (e.g., buildings, map features, terrain features, etc.) in a street-level viewing mode that combines the 3D object models with panoramic street level images. In this way, terrain and cityscapes may be explored and analyzed with the use of 3D models. For example, when browsing in such a mode, users can virtually visit cities by navigating between immersive 360° panoramas, e.g., step by step (or by bubbles where the panorama images were shot).

However, traditional implementations of user interfaces for exploring 3D maps or worlds generally have lacked a fast exploring approach for particular buildings or other objects present in the represented 3D environment. In other words, traditional 3D user interfaces have not provided a means for moving easily and freely around a selected object or building. For example, current browsing approaches do not work directly. Instead, the user typically has to find a "walking" or "flying" path and browse to the target location at the same time while keeping a proper view on the building.

To address this problem, a system 100 of FIG. 1 introduces a new user interface to interact with the 3D model objects of a 3D world. In one embodiment, a user accesses a 3D world application or service (e.g., in street-view panoramic viewing mode, or in true 3D free-navigation mode), wherein 3D models are shown or presented on the displayed user interface. The user can then select one or more models and rotates (or performs other types of interactions or manipulations) the selected object model (e.g., a building). In one embodiment, the system 100 uses a model-only rotation approach whereby the rotation happens to the model only while the rest of the other models or features within the currently rendered scene can remain unchanged, fade out of view, or move behind the model being rotated. This, for instance, can provide the user with a clear view of the selected model in any direction.

In another embodiment, the system 100 can use a model-centered world rotation approach whereby the whole scene can start to rotate around the center of the selected one or more models instead of just the model being rotated as described in the previous embodiment. In one embodiment, the viewing camera position for rendering the scene can be lifted or elevated so that the camera position flies above the surrounding buildings to provide a more unobstructed view of the selected model.

In one embodiment, when the user finishes the rotation, the system 100 calculates a new camera view position that results from the rotation. For example, the system 100 can calculate the degree offset of the selected object or building and the new camera view position. In uses cases where the 3D world includes panoramic images, this new camera view position is projected to the best corresponding street-level image, and the user's view is teleported to the new location. In one embodiment, the corresponding street-level image (e.g., a panoramic image) is determined based on the new camera view position. In addition or alternatively, the system 100 can apply criteria for selecting the corresponding street-level or panoramic image such as availability of images that correspond to the new camera view position, whether the selected object is occluded in the image when viewed from the new camera position, etc. In uses cases where the 3D world is based on rendered 3D models, the user interface or scene is re-rendered and presented from the perspective of the new camera view position.

More specifically, in one embodiment, a user may select an object model, such as a building, in a three-dimensional user interface. For example, the selected object model may be determined by raytracing from the current camera view position to determine what object or building is visible or more centrally located in rendered scene. The selected building model may include an entire 3D representation in the three-dimensional world user interface. After selection, the user may rotate the building, while avoiding the conventional limitations of an obstructed view and/or a lack of images. In one embodiment, the user may explore the building model by selecting it from a distance and exploring the path to the said model. The building object may otherwise be explored at any chosen distance, elevation, and/or vantage point.

As previously discussed, certain embodiments of the approaches described herein may also apply to using panoramic images as part of the 3D world user interface. The panoramic images may be constructed using any known technique to enable a user to pan 360° using image or photographic data. The panoramic viewpoints may further be integrated with 3D modelling data to provide a continuous image. Furthermore, the embodiments of the approaches described herein may be used with other available image presentation protocols and methods for rendering an image or representation in two or three dimensions.

In an example use case, a user using a three-dimensional world user interface may choose to explore a build model of interest. The user may begin by viewing the general area of the building model with a first viewpoint (or first camera position). The building, for instance, may be selected by ray tracing to determine whether the building is visible and/or in a predetermined selection area of the user interface display. The system 100 may then correlate the location of the ray tracing with a building ID number, thereby selecting the building model. Once selected, the user may then choose to change the view position. This may be done through any conventional user based mechanism including the speed and location of mouse "point and click" or a touch screen selection. The viewpoint changes in accord with the rotation of the building model (either step-wise or continuously) to a second viewpoint. This may cause a calculation of a second view position based on the rotation. Thus, the second viewpoint of the building model is obtained, which may be matched to a photographic image to render the scene from the new camera view position. By this process, a user may explore a building model at any desirable angle or elevation.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the 3D user interface platform 109 via the communication network 107. In one embodiment, the 3D user interface platform 109 perform the functions associated with providing model-centered rotation for a 3D world user interface.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as content provisioning services, location-based service applications, navigation applications, camera/imaging application, media player applications, social networking applications, calendar applications, and the like. In one embodiment, one of the applications 103 at the UE 101 may act as a client for the 3D user interface platform 109 and perform one or more functions of the 3D user interface platform 109. In one scenario, users are able to use different map modes, for example, photorealistic map, augmented reality map, etc., via one or more map applications. In one embodiment, one or more cameras of the UE 101 may implement various intelligent components to achieve an alignment between the virtual and 3D pictures. In one scenario, dual camera technology may be implemented to create more visual data.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, etc.). In one scenario, the one or more sensors 105 may detect properties for one or more display surfaces, for example, if the sensors 105 determines the surface for at least one object to be smooth, such feature may be implemented in the calculation of scores and/or ranking. In another scenario, the one or more UE 101 may have structure sensors, whereby the sensor data may be calculated either on the cloud or by the UE 101.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the 3D user interface platform 109 may be a platform with multiple interconnected components. The 3D user interface platform 109 may include multiple servers, intelligent networking devices, computing devices, components and corresponding software for determining at least one object model in a three-dimensional world user interface by causing a rotation from a first camera position to a second camera position.

In one embodiment, the 3D user interface platform 109 may determine an object model of interest to select from a first camera position. In one scenario, the object model may be a building model. In another scenario, the object model may be a landmark, interior feature, subterranean feature, aerial feature, or other like object of interest. In one embodiment, a user may select the object model in a three-dimensional world user interface from a first camera position. In one scenario, this selection may include ray tracing to identify a building or other like model. In one scenario, the three-dimensional world user interface may include a representation of terrain or cityscape obtained using available techniques including LiDAR and other like techniques to achieve photorealistic 3D maps.

In one scenario, the 3D map(s) may be explored using a three coordinate system through a 2-D user interface. In one embodiment, an interaction input may be determined with the object model to cause a rotation of the object model in the three-dimensional world user interface. In one scenario, the interaction input may take account of some combination of the direction and speed of a user selection relative to the screen coordinates to rotate the model accordingly.

In one embodiment, the 3D user interface platform 109 may cause a calculation of a second camera view position based on the degree and/or speed of rotation. In one scenario, the system 100 calculates the degree offset of the selected building and the commensurate second camera position. In one embodiment, the system 100 may cause a rendering of the three-dimensional world user interface based on the second camera position. In one scenario, the second camera position is matched to the best corresponding street-level or aerial image, and the user's view is teleported to the new location. In one embodiment, the first and second camera positions may include first and second panoramic images, respectively. In one scenario, the panoramic images may be obtained from LiDAR and other advanced sensor techniques to incorporate a mesh of 3D data into a 360° world representation. By of example, the system 100 may use any criteria for determining or selecting the "best" panoramic images that correspond to the desired camera positions. For example, the images may be selected based on whether there any occlusions of objects of interest, environmental conditions, visibility, temporal parameters, etc.

Figure 2:
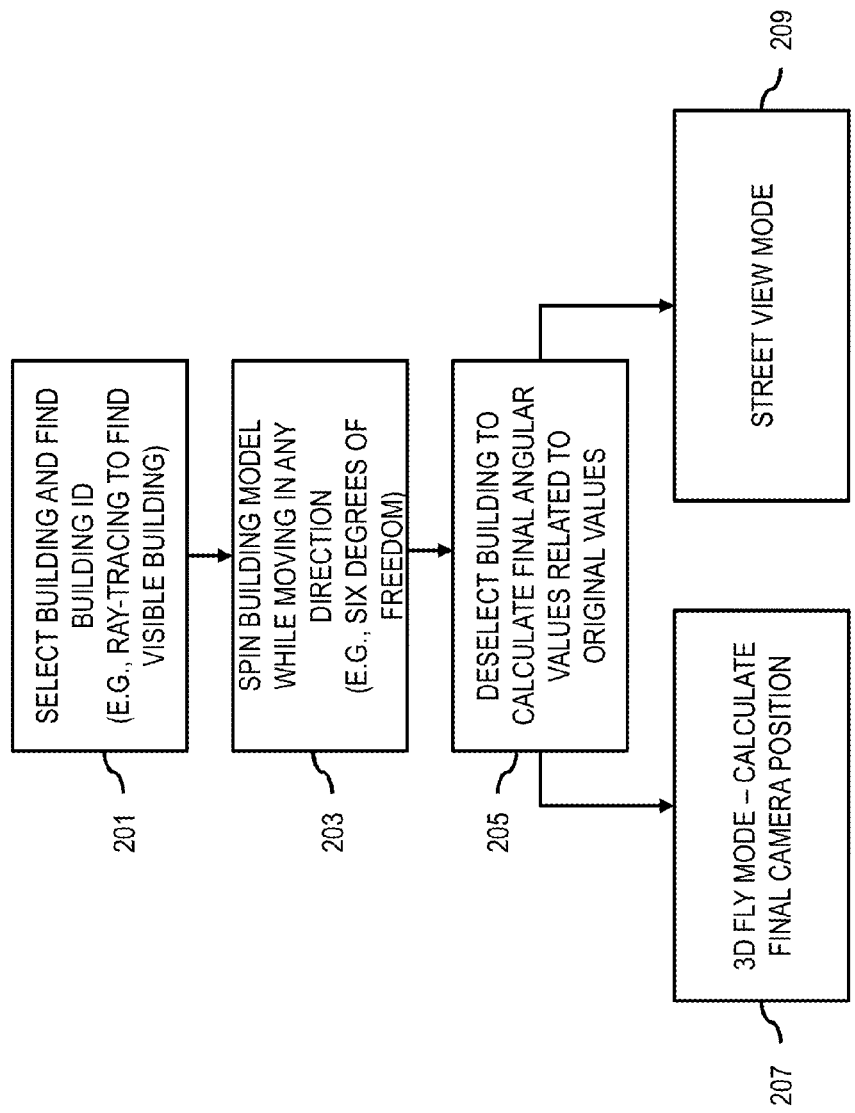
FIG. 2 illustrates a process for providing model-only rotation approach in a 3D map user interface example scenario, according to one embodiment.

In one embodiment, the 3D user interface platform 109 may cause a rendering of the rotation of the at least one object model in the three-dimensional world user interface using model only rotation. For example, FIG. 2 illustrates a process for providing model-only rotation approach in a 3D map user interface example scenario, according to one embodiment. In one scenario, the selected building model with associated building ID, may be selected and/or highlighted for rotation to allow a user to explore the model from a desired vantage point to the exclusion of other features of the three-dimensional world representation (process 201). As previously discussed, the selection may be determined using raytracing to identify a selected building model or other visible models or features.

In one scenario, the building model may be rotated or spun based on a user interaction input while other 3D world buildings, objects, and/or features (process 203). By way of example, the rotation or spinning may be performed using any of six degrees of freedom in any direction. In one scenario, the selected model may be highlighted to distinguish the model structure from other features in the three-dimensional world representation. In one scenario, the other models and/or features of the world representation may be partially or entirely faded out relative to the selected building model. In another scenario, the other models and/or region may be replaced by another background including another cityscape, terrain, or coordinate grid.

In process 205, once the user deselects the rotated building or otherwise indicates that rotation is complete, the system 100 can calculate the final angular values relative to the original angular values (e.g., values prior to rotation). The system 100 can then apply either a 3D "fly" mode (process 207) or a street-view mode (process 209) to render the scene based on the rotation. For example, in the 3D fly mode, the system 100 calculates the final camera position based on the angular offsets and moves the viewing camera position to the new position calculated from the rotation. In the street-view mode, the system 100 calculates the target geolocation on the street level and switches to the street-view mode at the target location.

Figure 3:
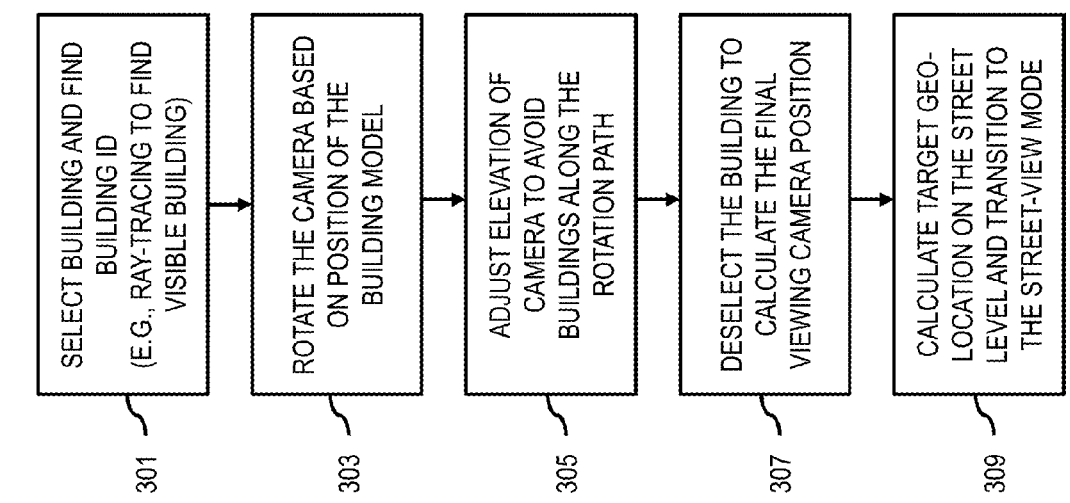
FIG. 3 illustrates a process for providing a model-centered world rotation approach in a 3D map user interface example scenario, according to one embodiment.

In one embodiment, the 3D user interface platform 109 may determine a selection of one object model in the three dimensional user interface to cause a rotation using a model-centered world rotation. For example, FIG. 3 illustrates a process for providing a model-centered world rotation approach in a 3D map user interface example scenario, according to one embodiment. In one scenario, the selected building model with associated building ID, may be selected as a location for rotation (process 301). In one embodiment, to implement a model-centered world rotation approach, the system 100 rotates the camera position for rendering the scene by setting the center of the selected building model as the center of rotation (process 303).

In one embodiment, the system 100 may determine a camera elevation parameter to avoid other models or other features in a rotation path of the model centered world rotation during the rendering of the object model (process 305). In one scenario, the camera viewpoint may be able to rotate on a prescribed path while making some deviation from the path to avoid viewing obstructions. In another scenario, the camera viewpoint may be able to rotate on a prescribed path and eliminate viewing obstructions by fading them out or removing targeted obstructions.

When the building model is deselected or the user otherwise indicates that the rotation is complete, the system 100 can calculate the final viewing camera position (e.g., the second camera view position when the original camera view position is designated as the first camera view position) (process 307). In process 309, the system 100, for instance, calculates the geolocation on the street level and transitions to the street-view mode at the target location as previously described. In one embodiment, the view positions between the first and second camera positions may include a rendering of one or more transition effects from the first camera view position to the second camera view position. In one scenario, the transition effects may include a targeted fading out of object models or features based on obstruction characteristics, personal preferences, and other like preferences or parameters. In one scenario, the transition effects may include photographic matching of the view position to render an accurate image in either a step-wise or continuous manner during rotation. In one scenario, the transition effects may include an animation of motion along a navigation path from the first camera position to the second camera position.

Returning to FIG. 1, in one embodiment, the 3D user interface platform 109 may create content repository 111 wherein visual features are calculated for each object surface, for example, building facades (in panoramic street view images) from different viewing angles. In another embodiment, the 3D user interface platform 109 may receive content information from various sources, for example, the sensors 105, third-party content providers, databases, etc. and may store the received information on the content repository 111. The content repository 111 may include identifiers to the UE 101 as well as associated information. Further, the information may be any multiple types of information that can provide means for aiding in the content provisioning process. In a further embodiment, the content repository 111 assists by providing information on identifying object surfaces, for example, building facade to place the virtual advertisement in photorealistic 3D map so as to appear consistently in both augmented reality and photorealistic 3D map view.

The services platform 113 may include any type of service. By way of example, the services platform 113 may include content (e.g., audio, video, images, etc.) provisioning services, application services, storage services, contextual information determination services, location based services, social networking services, information (e.g., weather, news, etc.) based services, etc. In one embodiment, the services platform 113 may interact with the UE 101, the 3D user interface platform 109 and the content provider 117a-117n (hereinafter content provider 117) to supplement or aid in the processing of the content information.

By way of example, services 115a-115n (hereinafter services 115) may be an online service that reflects interests and/or activities of users. In one scenario, the services 115 provide representations of each user (e.g., a profile), his/her social links, and a variety of additional information. The services 115 allow users to share media information, location information, activities information, contextual information, and interests within their individual networks, and provides for data portability.

The content provider 117 may provide content to the UE 101, the 3D user interface platform 109, and the services 115 of the services platform 113. The content provided may be any type of content, such as image content, video content, audio content, textual content, etc. In one embodiment, the content provider 117 may provide content that may supplement content of the applications 103, the sensors 105, the content repository 111 or a combination thereof. By way of example, the content provider 117 may provide content that may aid in causing a generation of at least one request to capture at least one content presentation. In one embodiment, the content provider 117 may also store content associated with the UE 101, the 3D user interface platform 109, and the services 115 of the services platform 113. In another embodiment, the content provider 117 may manage access to a central repository of data, and offer a consistent, standard interface to data, such as a repository of users' navigational data content.

By way of example, the UE 101, the 3D user interface platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
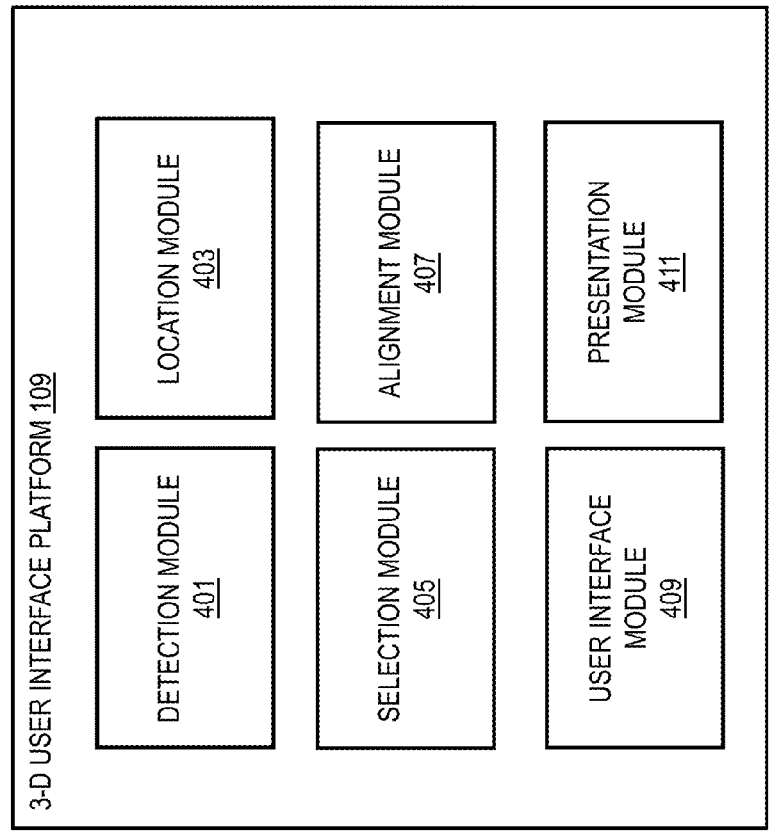
FIG. 4 is a diagram of the components of a diagram of the components of a 3D user interface platform, according to one embodiment.

FIG. 4 is a diagram of the components of the 3D user interface platform 109, according to one embodiment. By way of example, the 3D user interface platform 109 includes one or more components for determining at least one object model in a three-dimensional world user interface by causing a rotation from a first camera position to a second camera position. It is contemplated that the functions of these components may be combined in one or more components or performed by other components of equivalent functionality. In this embodiment, the 3D user interface platform 109 includes a detection module 401, a location module 403, a selection module 405, an alignment module 407, a user interface module 409, and a presentation module 411.

In one embodiment, the detection module 401 may determine at least one object model in a three-dimensional world user interface by causing a rotation from a first camera position to a second camera position. In multiple embodiments, the detection module 401 may process three-dimensional representation data of a three-dimensional world user interface and determine a representation based on the viewing input parameters and data. In one embodiment, the detection module 401 may determine how much content should be distributed and displayed or associated between viewing representations. In another embodiment, the detection module 401 may process one or more data sets to calculate visual features for at least one display surface associated with at least one object building model within an environment. In one embodiment, the detection module 401 may be integrated with advanced detection methods, such as LiDAR, to render surface features of one or more building models or other terrain surface features. In one embodiment, the detection module 401 may be integrated with a database of three-dimensional world model information as stored data or real-time data from servers, networks, and other like accessible sources.

In one embodiment, the location module 403 may coordinate viewing representations and effects based on the detection module 401 data, database, and/or user input information. For example, the database coordinate information may be used to construct a three-dimensional world representation to render a view position. Furthermore, the location module 403 may determine a coordinate location based on user interactive inputs, such as rotation, elevation, and proximity inputs. The location module 403 may also account for real-time viewing of the representation by coordination with cameras and/or sensors to account for imaging information to manipulate the user interface three-dimensional world representation. In another embodiment, the location module 403 may determine whether user equipment (UE) is in the vicinity of a viewing location. For example, the location module 403 may interact with application 103 where application 103 may activate UE 101 to receive or request detection of camera view positions where the sensors 105 determine that at least one UE 101 is entering an area where the 3D user interface platform 109 has knowledge of three-dimensional world representations. In one embodiment, the location module 403 may monitor the locations of the UE 101, when UE 101 are within a predetermined radius of an object model. In a further embodiment, the location module 403 may interact with the UE 101 to determine the position and orientation of the UE 101. Then, the location module 403 may compare the location and direction of the UE 101 so that the virtual contents displayed on the UE 101 are coordinated with the user's view point. In other words, as the UE 101 moves, the location module 403 ensures that the virtual content renders coordinated real-time visual information.

In one embodiment, the selection module 405 may request contents from, for example, the content repository 111, and/or one or more third-party content providers, such as content providers 117. As such, the selection module 405 may identify building model and other cityscape ID information. Furthermore, the selection module 405 may include user applications 103 to select and/or manipulate object models of interest. In one embodiment, the selection module 405 may be configured to select a building ID using ray tracing or other like method from a first view point. In one embodiment, the selected object model may be rotated, elevated, or twisted to achieve a targeted vantage point. In one embodiment, the selection may include the fading out or elimination of unwanted building models or surface features. In one embodiment, the selection module 405 may include a world rotation about a selected object model. In one scenario, the selection may include obstruction avoidance during rotation or a selection of an alternative rotation, elevation, or proximity path.

In one embodiment, the alignment module 407 may determine a prescribed path and the content to select and/or retrieve for display along a rotational, elevation, or proximity path. In one example embodiment, the 3D user interface platform 109 may receive, via communication network 107, requests for contents from, for example, UE 101. In one embodiment, the alignment module 407 may adjust a view point based on the detection of obstructions or other undesirable features in the three-dimensional world user interface. In one embodiment, the alignment module 407 may coordinate viewing with real-time information in conjunction with any user equipment including a mobile device. For example, the alignment module 407 may extract (or otherwise obtain) "current" positioning information and/or navigational information (e.g., routing directions) corresponding to a particular UE 101, or may retrieve such information from the 3D user interface platform 109, the sensors 105 or any other suitable source. Subsequently, the alignment module 407 may determine a suitable viewing position based on positional information and/or user preferential inputs. In another embodiment, the alignment module 407 causes, at least in part, an alignment between the real view and the virtual view for consistent virtual content experience when switching between a three-dimensional world representation and a coordination photographic based 3D map view.

In one embodiment, the user interface module 409 may be configured for exchanging information between UE 101 and the content repository 111, and/or one or more third-party content providers. In another embodiment, the user interface module 409 enables presentation of a graphical user interface (GUI) for displaying map images with content information in connection to a selected object model. For example, the user interface module 409 executes a GUI application configured to provide users with a determination of at least one object model in a three-dimensional world user interface by causing a rotation from a first camera position to a second camera position. The user interface module 409 employs various application programming interfaces (APIs) or other function calls corresponding to the applications 103 of UE 101, thus enabling the display of graphics primitives such as menus, buttons, data entry fields, etc., for generating the user interface elements. Still further, the user interface module 409 may be configured to operate in connection with augmented reality (AR) processing techniques, wherein various different applications, graphic elements and features may interact. For example, the user interface module 409 may coordinate the presentation of augmented reality map images in conjunction with content information for a given location or in response to a selected objection model representation. In a further embodiment, the user interface module 409 may cause a presentation of view point images as 3D representations in a world user interface, as photographic images, or a combination thereof.

In one embodiment, the presentation module 411 may process the database or real-time contents to determine object model representations from multiple view positions. For instance, the presentation module 411 may determine sizes or dimensions to display object models and/or features of a 3D world representation. In one scenario, the presentation module 411 may employ transition effects between multiple view positions to optimize the transient representation via the user interface. In another embodiment, the presentation module 411 may cause a presentation of content information in the most suitable manner for a consistent user experience.

Figure 5:
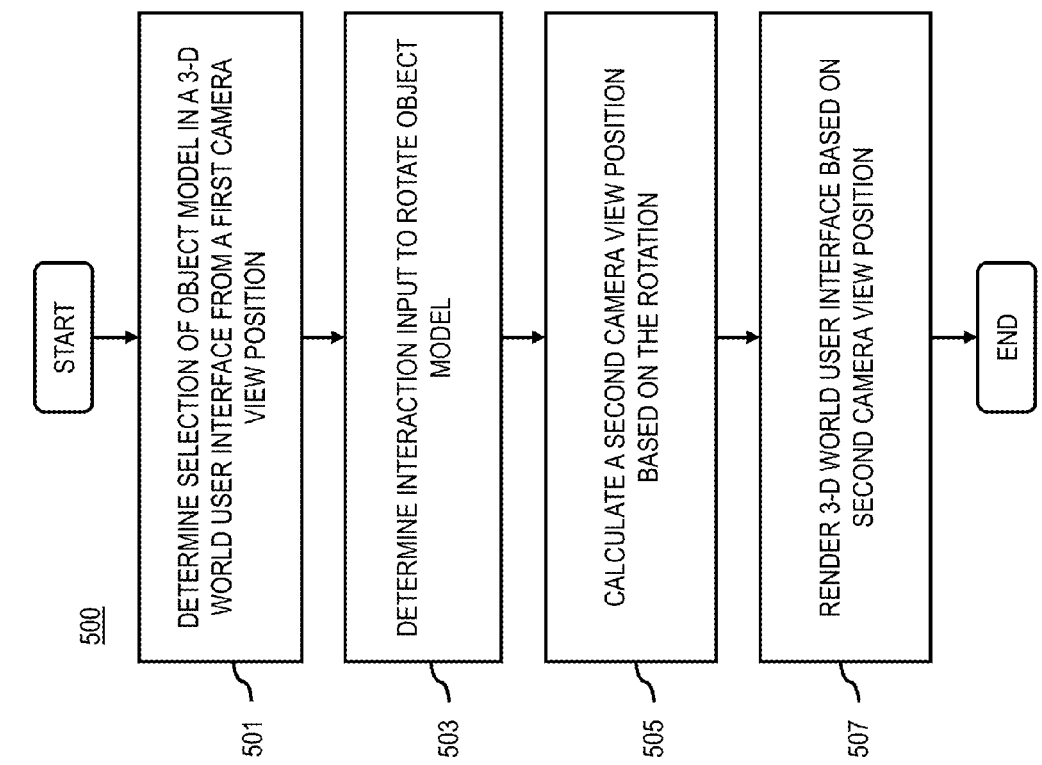
FIG. 5 is a flowchart of a process for providing model-centered rotation in a 3D user interface, according to one embodiment.
Figure 12:
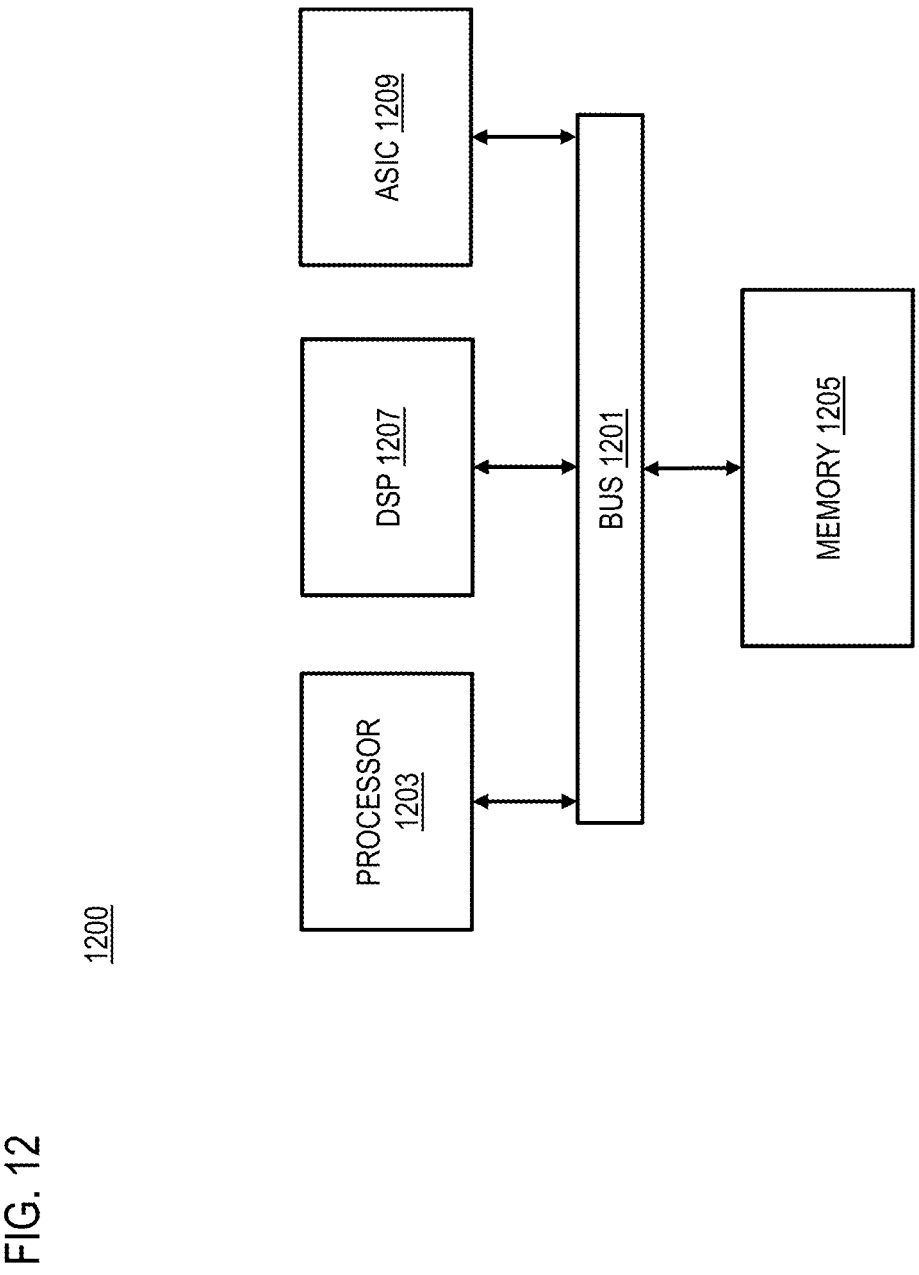
FIG. 12 is a diagram of a chip set that can be used to implement an embodiment of the invention.

FIG. 5 is a flowchart of a process for providing model-centered rotation in a 3D user interface, according to one embodiment. In one embodiment, the 3D user interface platform 109 performs the process 500 and is implemented in, for instance, a chip set including a processor and a memory as shown in FIG. 12. In addition or alternatively, the application 103 may perform all or a portion of the process 500.

In step 501, the 3D user interface platform 109 determines at least one selection of at least one object model in a three-dimensional world user interface, wherein the at least one object model is a three-dimensional representation of at least one object visible in the three-dimensional world user interface from a first camera view position. In one embodiment, a user may select an object model, such as a building, in a three-dimensional user interface. In one embodiment, the at least one selection of the at least one object model is determined based, at least in part, ray-tracing from the first camera view position (e.g., to identify object models that are visible from the first camera view position). The selection may be made by ray-tracing to identify the selected object model (e.g., building model). In one embodiment, identifying the selected module also includes associating the selected object model (e.g., building) with a model ID number (e.g., a building ID number). The selected object model may be entirely represented in 3D in the three-dimensional world user interface as shown in multiple embodiments.

In step 503, the 3D user interface platform 109 determines at least one interaction input with the at least one object model to cause, at least in part, a rotation of the at least one object model in the three-dimensional world user interface. For example, the interaction input may be a gesture or other command that specifies a rotation or other manipulation of the object model in the three-dimensional world user interface. Thus, after selection, the user may rotate the building model in order to view the said model from multiple viewpoints via interaction inputs. The selection with rotation may also include the exclusion of viewing obstructions, such as other objects models visible in the user interface. Also, the user may explore the object model (e.g., building model) by selecting it from a distance and explore the path to the object model by changing its proximity. In one embodiment, the object may be explored at any chosen distance, elevation, and/or vantage point.

In step 505, the 3D user interface platform 109 may cause, at least in part, a calculation of a second camera view position based, at least in part, on the rotation. For example, depending on the degree of rotation or what view of the object model (e.g., side of the building model) is made visible by the rotation, the system 100 calculates the second camera view position so that the object model is visible as rotated, and the corresponding 3D environment perspective is also updated accordingly. In one embodiment, the distance or proximity of the second camera view position can be equivalent the distance or proximity of the first camera view position (e.g., the camera view position prior to rotation). In addition or alternatively, the user can configure the second camera view position to shift relative to the first camera view position. For example, the second camera view position can be based on parameters associated with the rotation or input interaction (e.g., speed and direction of a user selection or rotation gesture).

In step 507, the 3D user interface platform 109 may cause, at least in part, a rendering of the three-dimensional world user interface based, at least in part, on the second camera view position. As described above, the rendering includes re-rendering the scene depicted in the 3D world user interface so that it is viewed from the perspective of the second camera location. In one embodiment, wherein the 3D world user interface presents at least one first panoramic image that is determined based, at least in part, on the first camera view position, the system 3D user interface platform 109 determines at least one second panoramic image to present in the three-dimensional world user interface based, at least in part, on the second camera view position.

In one embodiment, the at least one second panoramic image is determined further based, at least in part, on one or more predetermined criteria. By way of example, the one or more predetermined criteria include, at least in part, an availability criterion, an occlusion criterion, or a combination thereof. In other words, the 3D user interface platform 109 presents a street-view image that corresponds to the new or second camera view position to update the rendered scene in response to the rotation of the object model.

In one embodiment, to determine an availability of one or more panoramic images (e.g., the meet the availability criterion), the 3D user interface platform 109 queries one or more image or mapping repositories/databases using the second or new camera view position as a query parameter). If one or more image results are returned, the availability criterion is met, and if one or more image results are not returned the availability criterion is not met.

In one embodiment, to apply the occlusion criterion, the 3D user interface platform 109 can perform image processing and/or image recognition of the candidate images to determine whether the selected object is partially or wholly occluded. In one embodiment, the 3D user interface platform 109 can perform raytracing from the new camera position using 3D models of the environment to determine whether the selected object would be occluded from the perspective of the new camera position.

Figure 6:
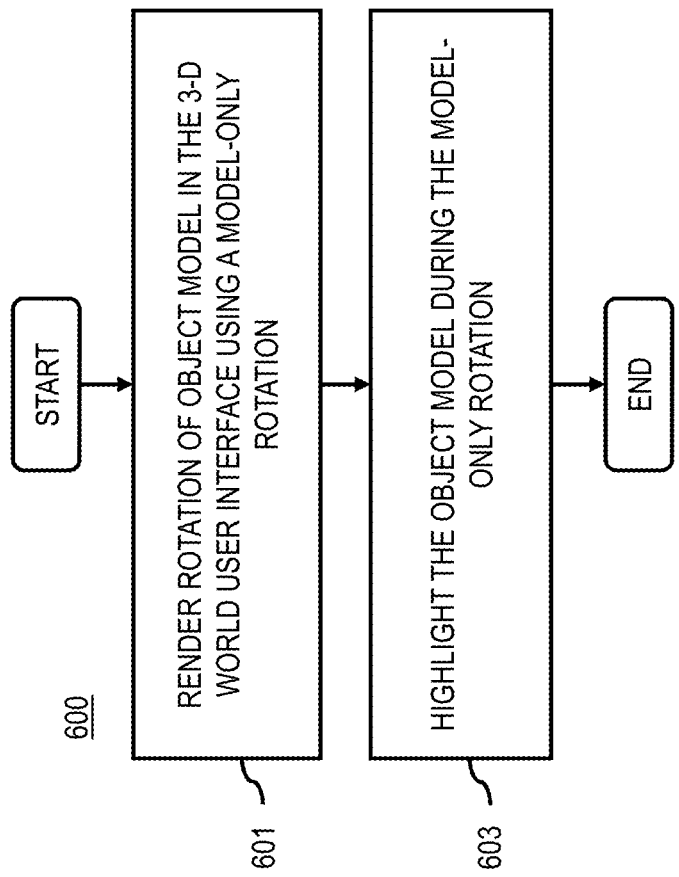
FIG. 6 is a flowchart of a process for providing model-centered rotation using a model-only rotation approach, according to one embodiment.

FIG. 6 is a flowchart of a process for providing model-centered rotation using a model-only rotation approach, according to one embodiment. In one embodiment, the 3D user interface platform 109 performs the process 600 and is implemented in, for instance, a chip set including a processor and a memory as shown in FIG. 12. In addition or alternatively, the application 103 may perform all or a portion of the process 600.

In step 601, the 3D user interface platform 109 causes, at least in part, a rendering of the rotation of the at least one object model in a three-dimensional world user interface using a model-only rotation. As previously described, in one embodiment of the model-only rotation approach, the 3D user interface platform 109 rotates only the selected object model, while keeping the environment and/or other object models visible in the environment stationary.

In step 603, the 3D user interface platform 109 optionally causes, at least in part, a highlighting of the at least one object model during the model-only rotation. For example, the selected model may be highlighted to distinguish the model structure from other features or objects in the three-dimensional world representation. In one embodiment, the highlighting comprises causing a fading out of one or more other models, one or more other features, or a combination thereof visible in the three-dimensional world user interface; a movement of the one or more other models, the one or more other features, or a combination thereof to behind a rendering location of the at least one object model in the three-dimensional world user interface; or a combination thereof. By way of example, the other models and/or features of the world representation may be partially or entirely faded out relative to the selected building model. Furthermore, the other building models and/or surface features may be replaced by another background including another cityscape, terrain, or coordinate grid.

Figure 7:
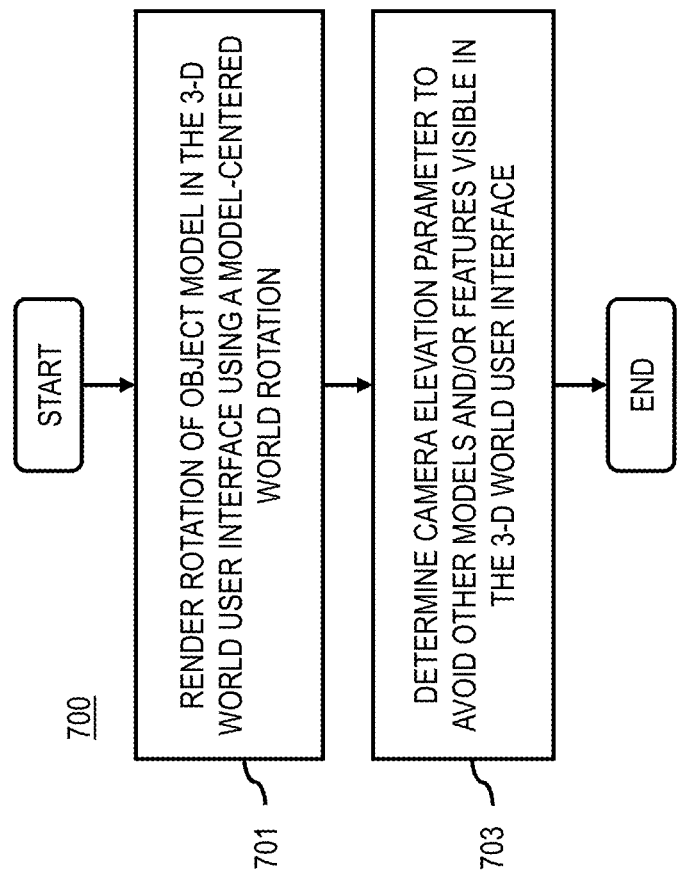
FIG. 7 is a flowchart of a process for providing model-centered rotation using a model-centered world rotation approach, according to one embodiment.

FIG. 7 is a flowchart of a process for providing model-centered rotation using a model-centered world rotation approach, according to one embodiment. In one embodiment, the 3D user interface platform 109 performs the process 700 and is implemented in, for instance, a chip set including a processor and a memory as shown in FIG. 12. In addition or alternatively, the application 103 may perform all or a portion of the process 700.

In step 701, the 3D user interface platform 109 causing, at least in part, a rendering of the rotation of the at least one object model in the three-dimensional world user interface using a model-centered world rotation. As previously described, in one embodiment of the model-centered world rotation approach, the 3D user interface platform 109 rotates camera position around the selected object model as the center of the rotation. In this way, the entire rendered environment including the selected object model is rotated to provide different views or to explore a selected object model.

In step 703, the 3D user interface platform 109 optionally determines at least one camera elevation parameter to avoid one or more other models, one or more other features, or a combination thereof in at least one rotation path of the model-centered world rotation during the rendering of the rotation of the at least one object model. By way of example, the camera viewpoint may be able to rotate on a prescribed path while making some deviation from the path to avoid viewing obstructions. In one embodiment, this may be accomplished by removing selected obstructions or fading out selected features.

Figure 8:
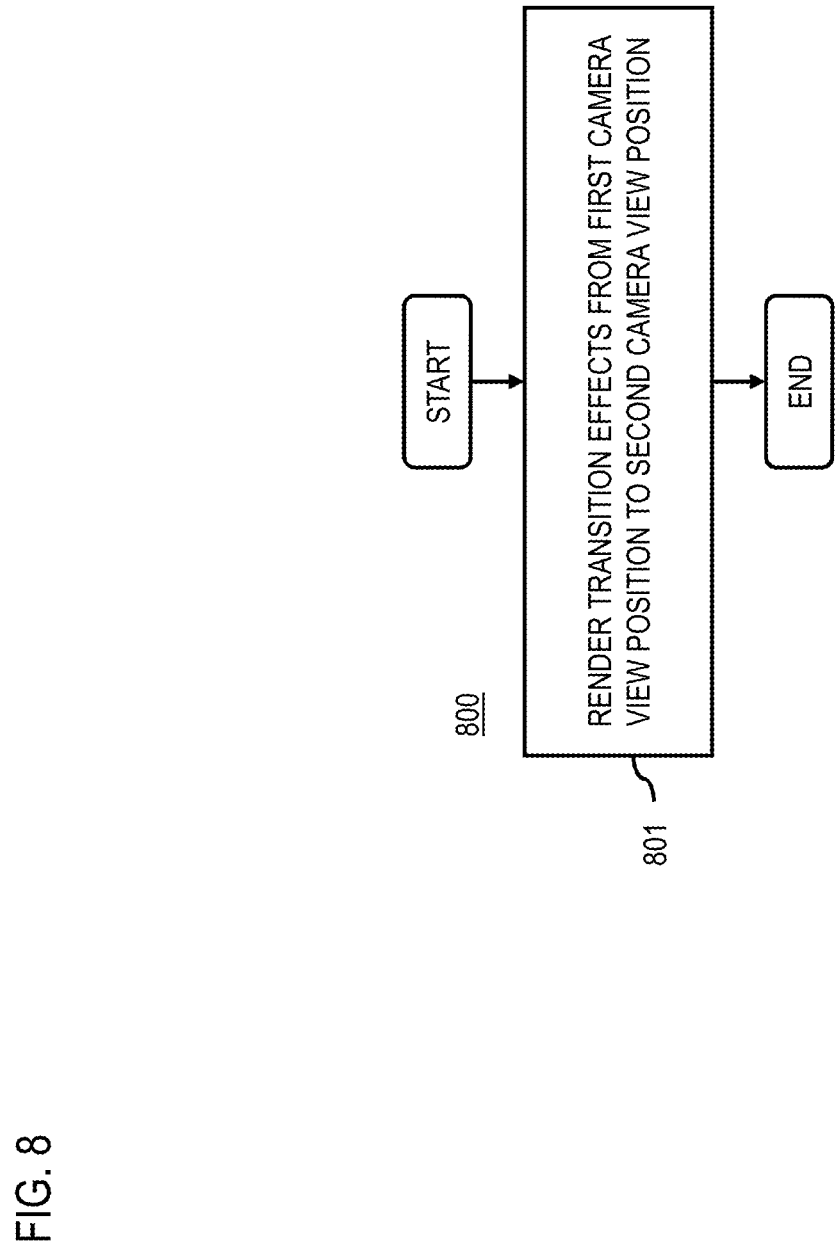
FIG. 8 is a flowchart of a process for rendering transitions effects for providing model-centered rotation, according to one embodiment.

FIG. 8 is a flowchart of a process for rendering transitions effects for providing model-centered rotation, according to one embodiment. In one embodiment, the 3D user interface platform 109 performs the process 800 and is implemented in, for instance, a chip set including a processor and a memory as shown in FIG. 12. In addition or alternatively, the application 103 may perform all or a portion of the process 800.

In step 801, the 3D user interface platform 109 may cause, at least in part, a rendering of one or more transition effects from the first camera view position to the second camera view position based, at least in part, on a distance value between the first camera view position and the second camera view position. By way of example, the 3D user interface platform 109 may compare the distance value between the camera positions against a distance threshold. If the value is greater than the distance threshold then a transition effect can be used. If the value is less than the distance threshold then no transition is applied.

In one embodiment, the one or more transition effects includes, at least in part, an animation of a motion along a navigation path from the first camera view position to the second camera view position. For example, if the distance is larger than the threshold distance value, the animation of the navigation path can advantageously give the user a frame of reference for the change from the first camera view position to the second camera view position to enable to user to better orient herself or himself to the change in perspective. It is completed that in addition to or in place of the animation described above, the 3D user interface platform 109 can use any transition effect to highlight the change from the first to the second camera view position. For example, the 3D user interface platform 109 can use reference arrows pointing from one position to another, superimposed images, picture-in-picture, radar style windows, etc.

Figure 9A:
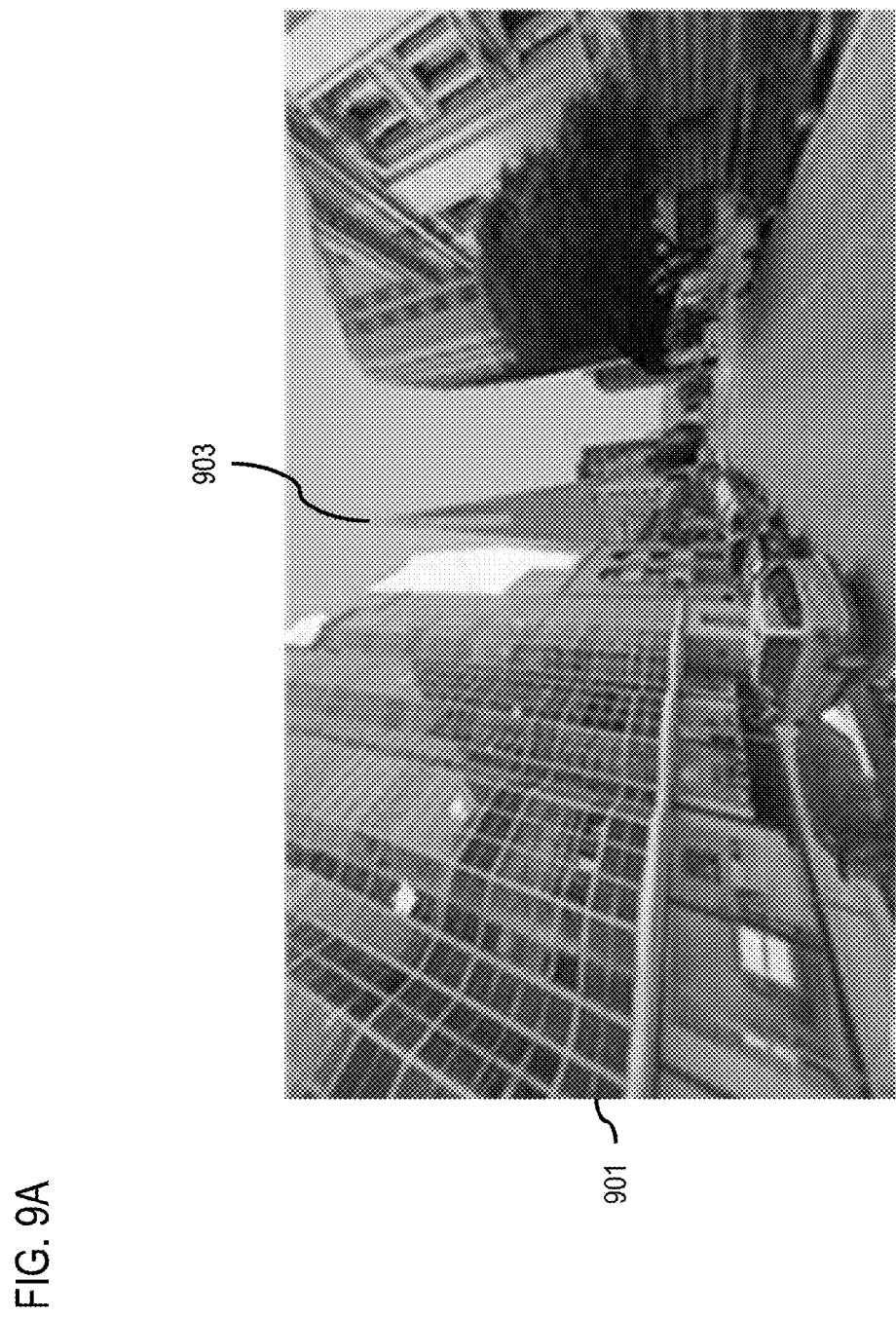
FIGS. 9A-9C are diagrams of user interfaces for providing model-centered rotation using a model-only rotation approach, according to one embodiment.
Figure 9B:
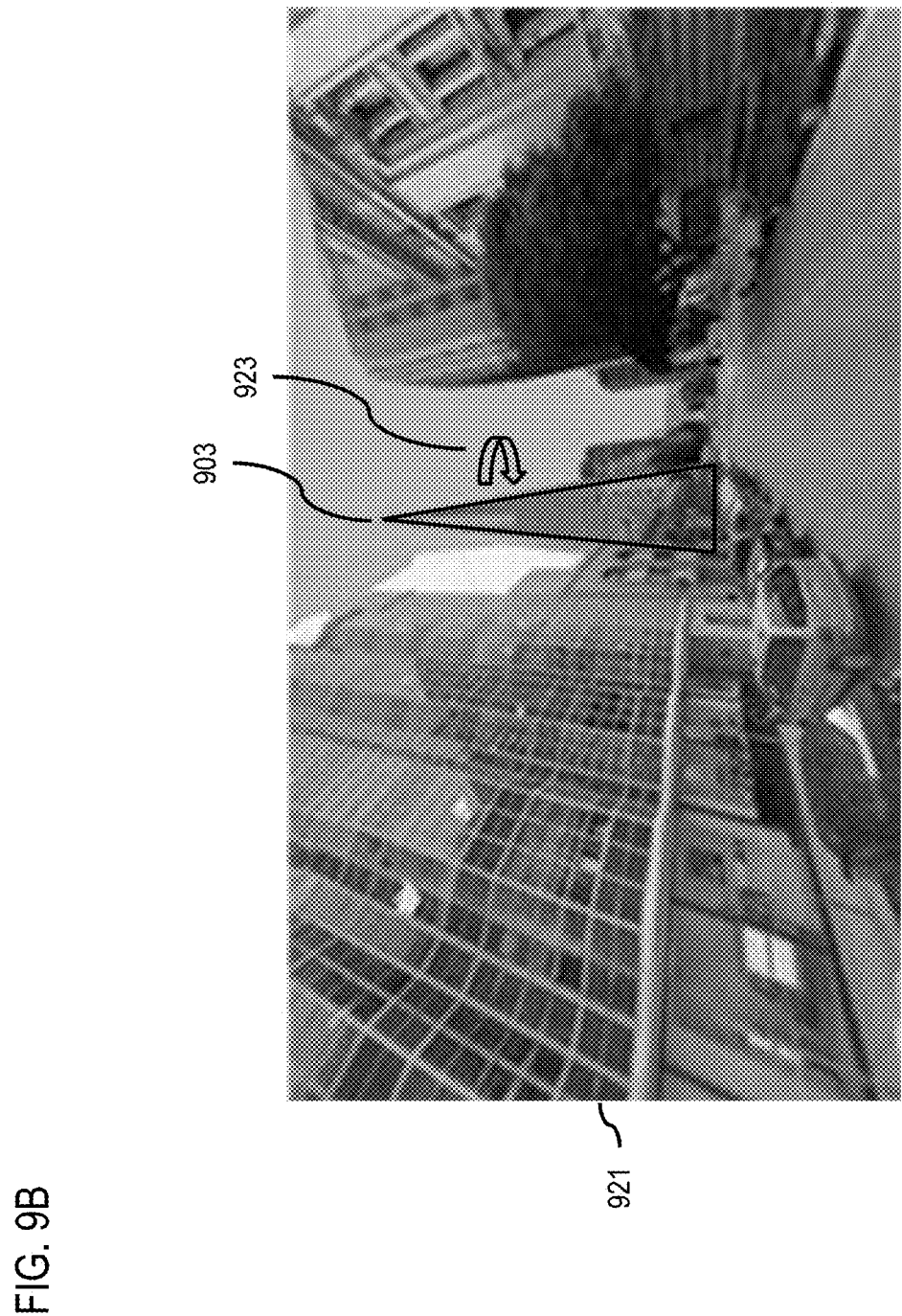
Figure 9C:
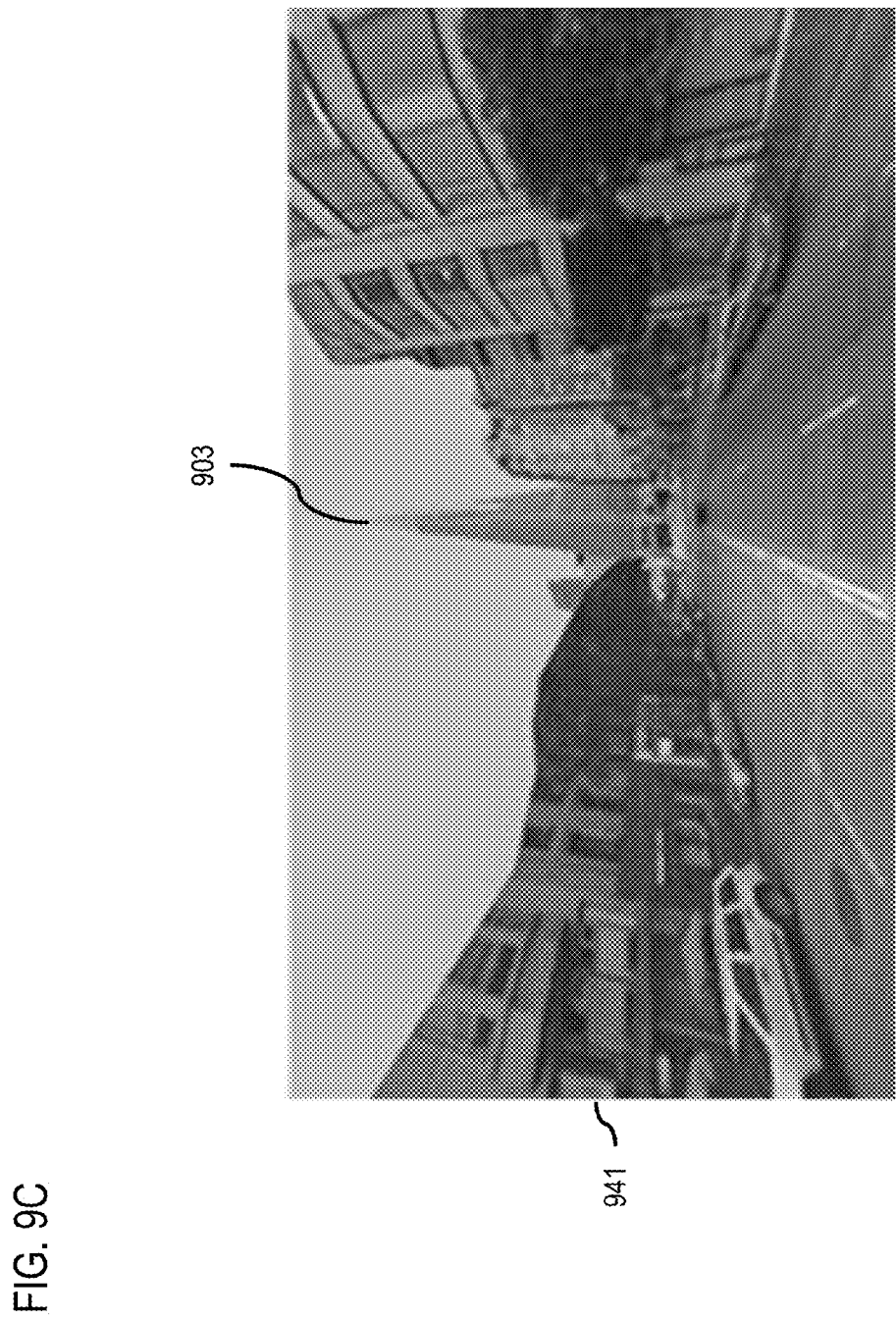

FIGS. 9A-9C are diagrams of user interfaces for providing model-centered rotation using a model-only rotation approach, according to one embodiment. FIG. 9A depicts a user interface (UI) 901 that is a 3D map user interface showing a street view panoramic image that includes 3D objects models of the buildings visible in the environment. In this example, the 3D user interface platform 109 applies raytracing from a camera view position used for rendering the UI 901 to determine that the building model 903 is visible in the scene and makes the building model 903 selectable by the user.

UI 921 of FIG. 9B shows that a user has selected building model 903 which is now highlighted using an outline of the building to indicate the selection. Once selected, the user can interact with the building model 903. In this example, the user performs a rotation gesture to indicate a command to rotate the building model 903. In response, the 3D user interface platform 109 uses the model-only rotation approach to render the rotation. The model-only rotation approach, for instance, will result in the scene and other objects/features visible in the UE 921 remaining stationary, while the building model 903 is rendered to rotate.

To indicate that the rotation is complete, the user can deselect the building model 903. Based on the deselection, the 3D user interface platform 109 will calculate a second or resulting camera view position based on the rotation. For example, the resulting camera view position will be a position within the mapping environment that will enable the user to view the building model 903 with the rotated side of building visible. As shown in FIG. 9C, the 3D user interface platform 109 determines a new street view panoramic image that shows the building model 903 from the rotated perspective and presents this new street view image in the UI 941. In this example, the building model 903 is rotated with respect to the initial UI 901 and the surrounding environment (e.g., new street view) is updated accordingly.

Figure 10A:
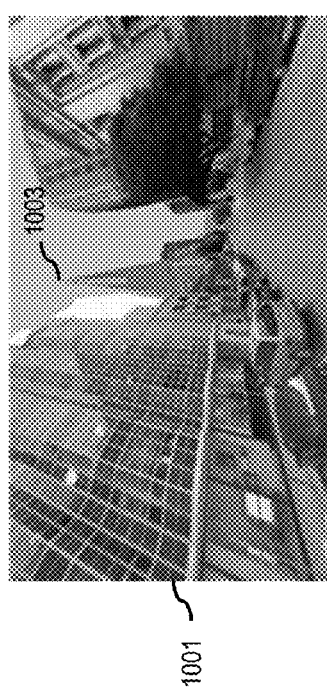
FIGS. 10A-10F are diagrams of user interfaces for providing model-centered rotation using a model-centered world rotation approach, according to one embodiment.

FIGS. 10A-10F are diagrams of user interfaces for providing model-centered rotation using a model-centered world rotation approach, according to one embodiment. Similar to FIG. 9A, the UI 1001 of FIG. 10A is a 3D map user interface showing a street view panoramic image that includes 3D objects models of the buildings visible in the environment. In this example, the 3D user interface platform 109 applies raytracing from a camera view position used for rendering the UI 1001 to determine that the building model 1003 is visible in the scene and makes the building model 903 selectable by the user.

Figure 10B:
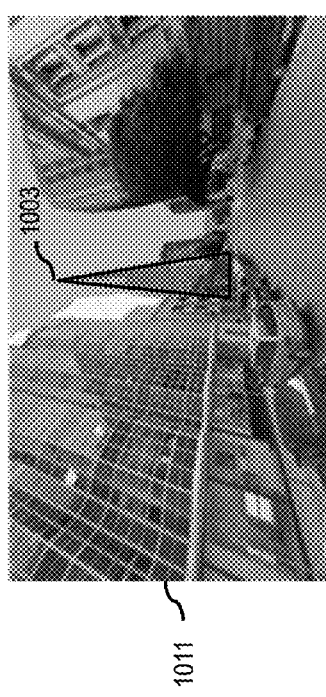
Figure 10C:
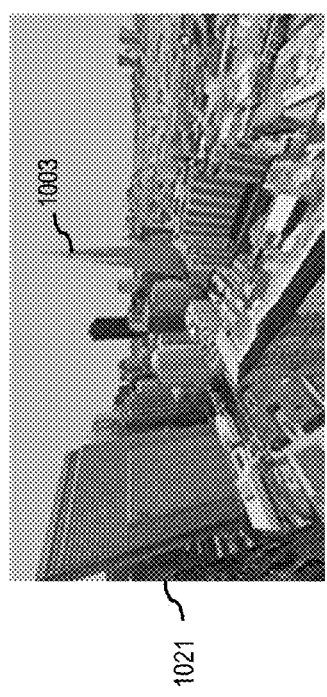

The UI 1011 of FIG. 10B shows that the user has selected building model 103, and the 3D user interface platform 109 initiates the process for rendering a model-centered world rotation approach. In this example, because the initial camera view position of the UI 1001 and UI 1011 is at street level, the 3D user interface platform 109 determines that applying the model-centered world rotation approach would result in obstructed views from the other visible buildings. Accordingly, the 3D user interface platform 109 calculates a camera elevation that would avoid obstructions from the other buildings and renders the UI 1021 of FIG. 10C to depict the environment from the new camera elevation. In this example, only the camera elevation has changed, the distance from the camera position to the building object 1003 remains the same as in the previous UIs.

Figure 10D:
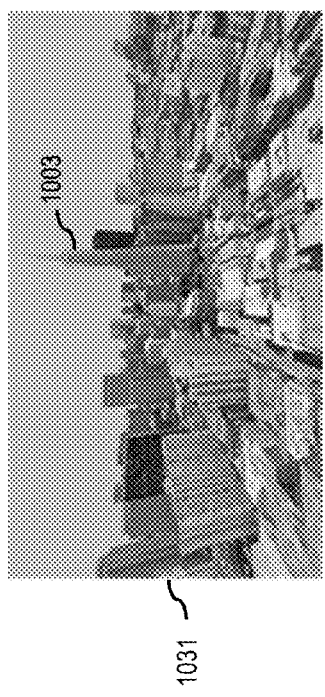
Figure 10E:
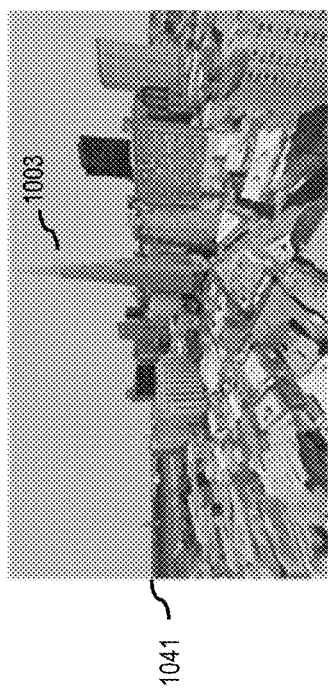

The UI 1031 of FIG. 10D and the UI 1041 of FIG. 10E depict a rotation sequence in which the 3D user interface platform 109 rotates the camera position for rendering the scene with the center point of the rotation set as the center of the building model 1003. In this way, the entire different views of the building model 1003 can be explored with keeping the building orientation in alignment with the surrounding environment.

Figure 10F:
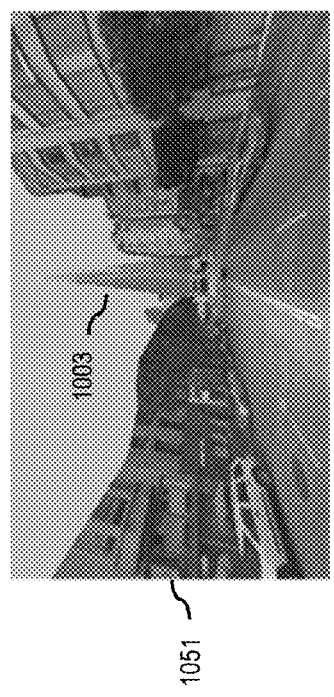

Once the user has completed the rotation, the 3D user interface platform 109 calculates a new camera position that results from the rotation but at the original elevation of the initial camera position as shown in UI 1051 of FIG. 10F. Because this example includes street view panoramic images, the 3D user interface platform 109 also determines a new street view panoramic image that shows the building model 1003 from the rotated perspective and presents this new street view image in the UI 1051. For example, a "best" panoramic image may be selected (e.g., a panoramic image that meet predetermined selection criteria) to display the objected from the new rotated view point.

The processes described herein for providing model-centered rotation in a 3D user interface may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
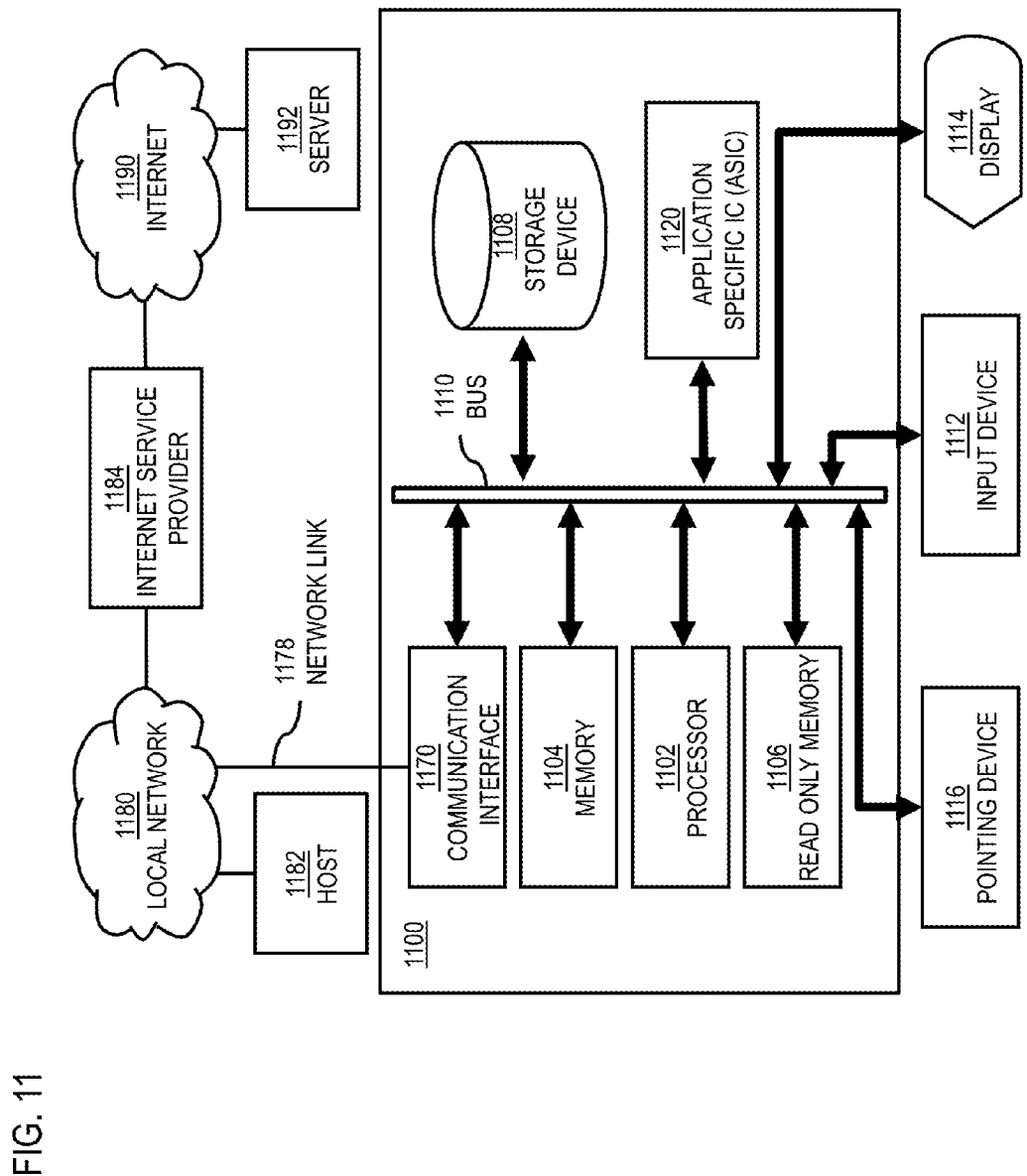
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide model-centered rotation in a 3D user interface as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing model-centered rotation in a 3D user interface.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to providing model-centered rotation in a 3D user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for providing model-centered rotation in a 3D user interface. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing model-centered rotation in a 3D user interface, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for providing model-centered rotation in a 3D user interface to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to provide model-centered rotation in a 3D user interface as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of providing model-centered rotation in a 3D user interface.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide model-centered rotation in a 3D user interface. The memory 1205 also stores the data associated with or generated by the execution of the inventive steps.

Figure 13:
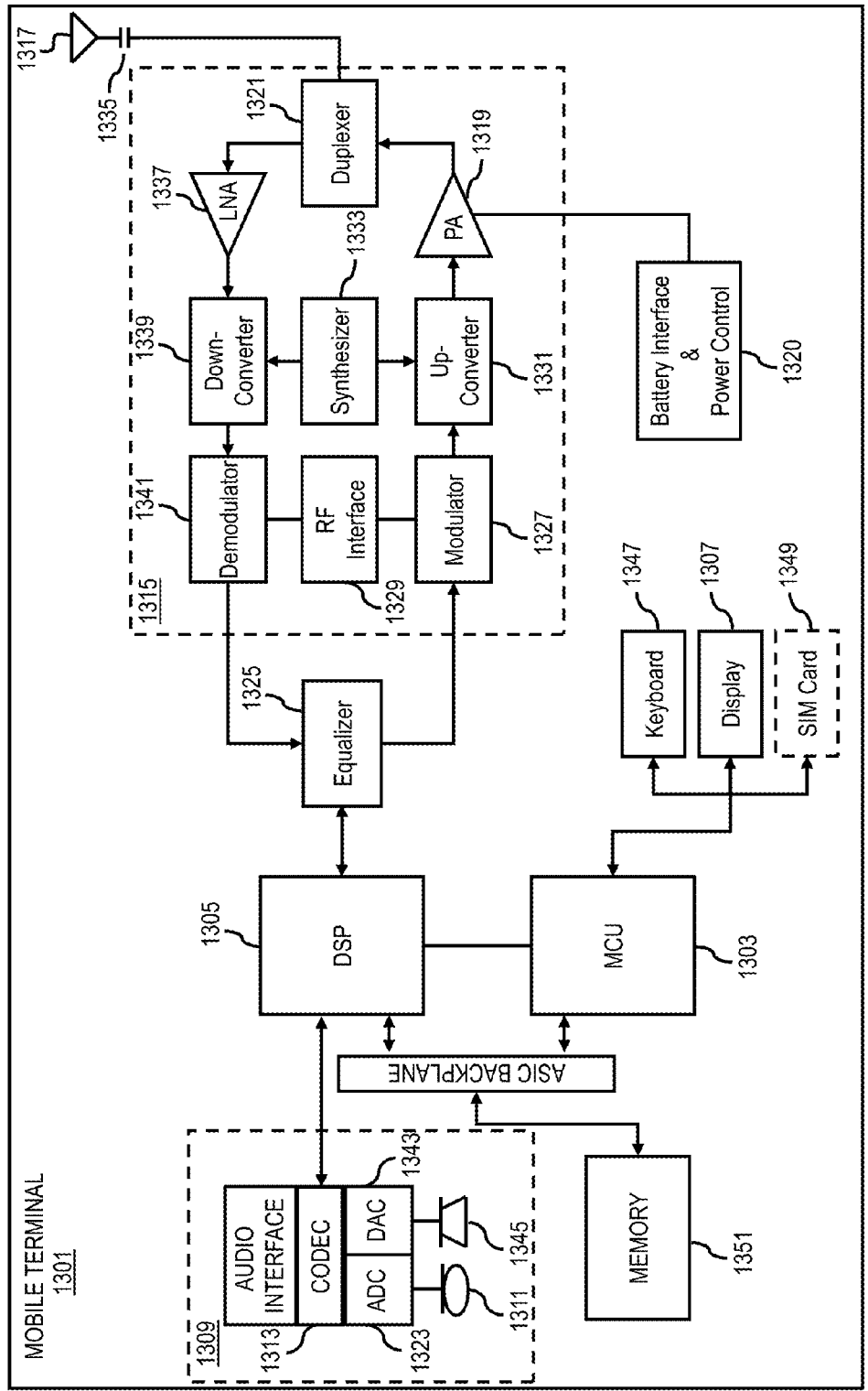
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing model-centered rotation in a 3D user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing model-centered rotation in a 3D user interface. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairment that occurs during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to provide model-centered rotation in a 3D user interface. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving, by an apparatus, a user selection of an object model in a three-dimensional world user interface on a user device, wherein the object model is a three-dimensional virtual outline of a real-world object visible in the three-dimensional world user interface from a first camera view real-world position of the user device, wherein the real-world object is a point of interest, and wherein the three-dimensional world user interface displays at least one first street-view panoramic photographic image that is received at the user device via a network based, at least in part, on the first camera view real-world position;
    determining, by the apparatus, at least one user interaction input with the object model aligned with the real-world object and then presented in the at least one first street-view panoramic photographic image to initiate a rotation of the object model around an axis in the three-dimensional world user interface;
    initiating, by the apparatus, a calculation of a second camera view real-world position based, at least in part, on the rotation;
    determining, by the apparatus, at least one second street-view panoramic photographic image depicting the real-world object substantially at the position based on the second camera view real-world position; and
    initiating, by the apparatus, a rendering of the three-dimensional world user interface based, at least in part, on the second camera view real-world position to display the at least one second street-view panoramic photographic image on the user device in real-time while the user device remains at the first camera view real-world position,
    wherein the at least one second street-view panoramic photographic image is received at the user device via the network.

2. A method of claim 1, wherein the at least one second street-view panoramic photographic image is determined further based, at least in part, on one or more predetermined criteria; and wherein the one or more predetermined criteria include, at least in part, an availability criterion, an occlusion criterion, or a combination thereof, and
    wherein the axis that the at least one object model is rotated around is a vertical axis, and the real-world object is a building or landmark.

3. A method of claim 1, further comprising:
    initiating a rendering of the rotation of the object model in the three-dimensional world user interface using a model-only rotation that rotates on a prescribed path while making one or more deviations from the path to avoid viewing one or more real-world obstructions,
    wherein the at least one user interaction input includes a user rotation gesture.

4. A method of claim 3, further comprising:
    initiating a highlighting of the object model during the model-only rotation.

5. A method of claim 4, wherein the highlighting comprises causing a fading out of one or more other models, one or more other features, or a combination thereof visible in the three-dimensional world user interface; a movement of the one or more other models, the one or more other features, or a combination thereof to behind a rendering location of the at least one object model in the three-dimensional world user interface; or a combination thereof.

6. A method of claim 1, further comprising:
    initiating a rendering of the rotation of the object model around the vertical axis in the three-dimensional world user interface using a model-centered world rotation.

7. A method of claim 6, further comprising:
    determining at least one camera elevation parameter to avoid one or more other models, one or more other features, or a combination thereof in at least one rotation path of the model-centered world rotation during the rendering of the rotation of the object model.

8. A method of claim 1, further comprising:
    initiating a rendering of one or more transition effects from the first camera view real-world position to the second camera view real-world position based, at least in part, on a distance value between the first camera view real-world position and the second camera view real-world position, and
    wherein the apparatus is embedded in the user device.

9. A method of claim 8, wherein the one or more transition effects includes, at least in part, an animation of a motion along a navigation path from the first camera view real-world position to the second camera view real-world position.

10. A method of claim 1, further comprising:
    determining the object model as selected by the user selection based, at least in part, ray-tracing from the first camera view real-world position that the real-world object is visible in a predetermined area in the at least one first street-view panoramic photographic image.

11. An apparatus comprising:
    at least one processor; and
    at least one memory including computer program code for one or more programs, the at least one memory and the computer program code configured to, with the at least one processor, cause the apparatus to perform at least the following, receive a user selection of an object model in a three-dimensional world user interface on a user device, wherein the object model is a three-dimensional virtual outline of a real-world object visible in the three-dimensional world user interface from a first camera view real-world position of the user device, wherein the real-world object is a point of interest, and wherein the three-dimensional world user interface displays at least one first street-view panoramic photographic image that is received at the user device via a network based, at least in part, on the first camera view real-world position;

determine at least one user interaction input with the object model aligned with the real-world object and then presented in the at least one first street-view panoramic photographic image to initiate a rotation of the object model around an axis in the three-dimensional world user interface;

initiate a calculation of a second camera view real-world position based, at least in part, on the rotation;

determine at least one second street-view panoramic photographic image depicting the real-world object substantially at the position based on the second camera view real-world position; and initiate a rendering of the three-dimensional world user interface based, at least in part, on the second camera view real-world position to display the at least one second street-view panoramic photographic image on the user device in real-time while the user device remains at the first camera view real-world position, wherein the at least one second street-view panoramic photographic image is received at the user device via the network.

12. An apparatus of claim 11, wherein the at least one second street-view panoramic photographic image is determined further based, at least in part, on one or more predetermined criteria; and wherein the one or more predetermined criteria include, at least in part, an availability criterion, an occlusion criterion, or a combination thereof.

13. An apparatus of claim 11, wherein the apparatus is further caused to:

initiate a rendering of the rotation of the object model in the three-dimensional world user interface using a model-only rotation.

14. An apparatus of claim 13, wherein the apparatus is further caused to:

initiate a highlighting of the object model during the model-only rotation.

15. An apparatus of claim 14, wherein the highlighting comprises causing a fading out of one or more other models, one or more other features, or a combination thereof visible in the three-dimensional world user interface; a movement of the one or more other models, the one or more other features, or a combination thereof to behind a rendering location of the at least one object model in the three-dimensional world user interface; or a combination thereof.

16. An apparatus of claim 11, wherein the apparatus is further caused to:

initiate a rendering of the rotation of the object model around the vertical axis in the three-dimensional world user interface using a model-centered world rotation.

17. An apparatus of claim 16, wherein the apparatus is further caused to:

determine at least one camera elevation parameter to avoid one or more other models, one or more other features, or a combination thereof in at least one rotation path of the model-centered world rotation during the rendering of the rotation of the object model.

18. A non-transitory computer-readable storage medium carrying one or more sequences of one or more instructions which, when executed by one or more processors, cause an apparatus to at least perform the following steps:

receiving a user selection of an object model in a three-dimensional world user interface on a user device, wherein the object model is a three-dimensional virtual outline of a real-world object visible in the three-dimensional world user interface from a first camera view real-world position of the user device, wherein the real-world object is a point of interest, and wherein the three-dimensional world user interface displays at least one first street-view panoramic photographic image that is received at the user device via a network based, at least in part, on the first camera view real-world position;

determining at least one user interaction input with the object model aligned with the real-world object and then presented in the at least one first street-view panoramic photographic image to initiate a rotation of the object model around an axis in the three-dimensional world user interface;

initiating a calculation of a second camera view real-world position based, at least in part, on the rotation;

determining at least one second street-view panoramic photographic image depicting the real-world object substantially at the position based on the second camera view real-world position; and initiating a rendering of the three-dimensional world user interface based, at least in part, on the second camera view real-world position to display the at least one second street-view panoramic photographic image on the user device in real-time while the user device remains at the first camera view real-world position, wherein the at least one second street-view panoramic photographic image is received at the user device via the network.

19. A non-transitory computer-readable storage medium of claim 18, wherein the at least one second street-view panoramic photographic image is determined further based, at least in part, on one or more predetermined criteria; and wherein the one or more predetermined criteria include, at least in part, an availability criterion, an occlusion criterion, or a combination thereof.

20. A non-transitory computer-readable storage medium of claim 18, wherein the apparatus is further caused to perform:

initiating a rendering of the rotation of the object model in the three-dimensional world user interface using a model-only rotation.

* * * * *